United States Patent
Fehrenbach et al.

(10) Patent No.: US 12,231,248 B2
(45) Date of Patent: *Feb. 18, 2025

(54) URLLC DAI AND LTI

(71) Applicant: Fraunhofer-Gesellschaft zur Förderung der angewandten Forschung e.V., Munich (DE)

(72) Inventors: Thomas Fehrenbach, Berlin (DE); Cornelius Hellge, Berlin (DE); Baris Göktepe, Berlin (DE); Thomas Wirth, Berlin (DE); Thomas Schierl, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,005

(22) Filed: Feb. 27, 2024

(65) Prior Publication Data
US 2024/0356685 A1   Oct. 24, 2024

Related U.S. Application Data

(63) Continuation of application No. 17/192,330, filed on Mar. 4, 2021, now Pat. No. 11,949,519, which is a
(Continued)

(30) Foreign Application Priority Data

Sep. 27, 2018 (EP) .................................. 18197383

(51) Int. Cl.
*H04L 1/1867* (2023.01)
*H04L 1/00* (2006.01)
(Continued)

(52) U.S. Cl.
CPC ............ *H04L 1/1896* (2013.01); *H04L 1/003* (2013.01); *H04L 1/0038* (2013.01); *H04W 72/1263* (2013.01); *H04W 72/23* (2023.01)

(58) Field of Classification Search
CPC ..... H04L 1/1896; H04L 1/003; H04L 1/0038; H04L 5/0053; H04L 5/0055;
(Continued)

(56) References Cited

U.S. PATENT DOCUMENTS

| | | | |
|---|---|---|---|
| 9,362,998 | B2 | 6/2016 | Debdeep et al. |
| 2012/0039280 | A1 | 2/2012 | Chen et al. |

(Continued)

FOREIGN PATENT DOCUMENTS

| | | |
|---|---|---|
| CN | 104521304 A | 4/2015 |
| CN | 108353316 A | 7/2018 |

(Continued)

OTHER PUBLICATIONS

Nokia, "Discussion on reliability enhancement for PDCCH, 3GPP TSG RAN WG1 #92b R1-1804617", Nokia Shanghai Bell, http://www.3gpp.org/ftp/tsg_ran/WG1_RL1/TSGR1_92b/Docs/R1-1804617.zip>, Apr. 20, 2018.

(Continued)

*Primary Examiner* — Rushil P. Sampat
(74) *Attorney, Agent, or Firm* — NKL LAW; Jae Youn Kim

(57) ABSTRACT

A wireless communication system includes one or more base stations, and one or more user devices, UEs. The base station is configured to transmit data to a UE being served by the base station, the data including control data and user data, the user data including at least first user data and second user data, the first user data associated with a first service and second data associated with second service, the first and second services having one or more different transmission
(Continued)

requirements. Responsive to receiving in the control data a grant for a feedback transmission, the UE is configured to send a feedback to the base station, the feedback indicating for one or more data blocks of the data a successful or non-successful reception at the UE. The control data includes a first downlink assignment index, DAI, associated with the first data, and a second DAI associated with the second data.

19 Claims, 7 Drawing Sheets

Related U.S. Application Data continuation of application No. PCT/EP2019/076110, filed on Sep. 26, 2019.

(51) Int. Cl.
*H04W 72/1263* (2023.01)
*H04W 72/23* (2023.01)

(58) Field of Classification Search
CPC .... H04L 1/0018; H04L 5/0092; H04W 72/23; H04W 72/1263; H04W 72/1284; H04W 72/1257; H04W 72/1289; H04W 72/535; H04W 72/21
See application file for complete search history.

(56) References Cited

U.S. PATENT DOCUMENTS

| | | | |
|---|---|---|---|
| 2012/0236812 A1 | 9/2012 | Chen et al. | |
| 2013/0336160 A1 | 12/2013 | Yin et al. | |
| 2014/0321422 A1 | 10/2014 | Choi et al. | |
| 2015/0131494 A1 | 5/2015 | He et al. | |
| 2017/0142695 A1* | 5/2017 | Chen | H04L 5/0055 |
| 2017/0288819 A1 | 10/2017 | Chen et al. | |
| 2018/0323907 A1 | 11/2018 | Takeda et al. | |
| 2019/0069321 A1 | 2/2019 | Akkarakaran et al. | |
| 2019/0159206 A1* | 5/2019 | Sun | H04W 72/23 |
| 2019/0349973 A1 | 11/2019 | Yang et al. | |
| 2021/0143945 A1 | 5/2021 | Park et al. | |

FOREIGN PATENT DOCUMENTS

| | | |
|---|---|---|
| JP | 2015-530011 A | 10/2015 |
| WO | 2017/110954 A1 | 6/2017 |

OTHER PUBLICATIONS

Ericsson, "On HARQ Management, 3GPP TSG RAN WG1 #91 R1-1721013", http://www.3gpp.org/ftp/tsg_ran/WG1_RL1/TSGR1_91/Docs/R1-1721013.zip>, Dec. 1, 2017.
Fraunhofer HHI, "Scheduling/HARQ Processing Timeline Enhancements for NR URLLC, 3GPP TSG RAN WG1 #94b R1-1810486", Fraunhofer IIS, http://www.3gpp.org/ftp/tsg_ran/WG1_RL1/TSGR1_94b/Docs/R1-1810486.zip>, Sep. 28, 2018.
NTT Docomo, Inc., "Remaining issues on HARQ-ACK codebook and CA, 3GPP TSG RAN WG1 #92b R1-1805059", http://www.3gpp.org/ftp/tsg_ran/WG1_RL1/TSGR1_92b/Docs/R1-1805059.zip, Apr. 20, 2018.
Kohei Saito, "Office Action for JP Application No. 2021-517446", Jun. 20, 2022, JPO, Japan.
Qualcomm Inc., "Open Issues on CA", 3GPP Draft, R1-1720694, "Open Issues on CA", 3GPP, Mobile Competence Center, Sophia-Antipolis Cedex, France, vol. RAN WG1, No. Reno, NV, USA, Nov. 2017, XP051370155.
Qualcomm Incorporated, R1-1720694, Open Issues on CA, 3GPP TSG RAN WG1 #91, 3GPP (published on Nov. 18, 2017).
Institute for Information Industry (III), R1-155916, HARQ-ACK codebook determination, 3GPP TSG RAN WG1 #82bis, 3GPP (published on Sep. 25, 2015).
Nokia et al., R1-1808569, On UL inter-UE multiplexing between eMBB and URLLC, 3GPP TSG RAN WG1 #94, 3GPP Server Release Date (Aug. 10, 2018), Gothenburg, Sweden.
62669941, Specification_Drawings_2018-05-10 (Year: 2018).

* cited by examiner

URLLC DAI AND LTI

CROSS-REFERENCES TO RELATED APPLICATIONS

This application is a continuation of U.S. patent application Ser. No. 17/192,330, filed Mar. 4, 2021, now issued as Patent (U.S. Pat. No. 11,949,519 B2), which is incorporated herein by reference in its entirety, which in turn is a continuation of International Application No. PCT/EP2019/076110, filed Sep. 26, 2019, which is incorporated herein by reference in its entirety, and additionally claims priority from European Application No. EP 18197383.5. . . .

The present application relates to the field of wireless communication systems or networks, more specifically to approaches for providing a HARQ feedback.

BACKGROUND OF THE INVENTION

FIGS. 1A-1B are schematic representation of an example of a terrestrial wireless network 100 including, as is shown in FIG. 1A a core network 102 and one or more radio access networks $RAN_1$, $RAN_2$, . . . . $RAN_N$. FIG. 1B is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enable these devices to collect and exchange data across an existing network infrastructure. FIG. 1B shows an exemplary view of only five cells, however, the $RAN_n$ may include more or less such cells, and $RAN_n$ may also include only one base station. FIG. 1B shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1B shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1B by the arrows pointing to "core". The core network 102 may be connected to one or more external networks. Further, some or all of the respective base station $gNB_1$ to $gNB_5$ may connected, e.g. via the S1 or X2 interface or XN interface in NR, with each other via respective backhaul links $116_1$ to $116_5$, which are schematically represented in FIG. 1B by the arrows pointing to "gNBs".

For data transmission a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length. Each subframe may include two slots of 6 or 7 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIGS. 1A-1B may by an heterogeneous network having distinct overlaid networks, e.g., a network of macro cells with each macro cell including a macro base station, like base station $gNB_1$ to $gNB_5$, and a network of small cell base stations (not shown in FIGS. 1A-1B), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIGS. 1A-1B, for example in accordance with the LTE-advanced pro standard or the 5G or NR, New Radio, standard.

In mobile communication networks, for example in a network like that described above with reference to FIGS. 1A-1B, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above mentioned devices. Such devices may also communicate directly with each other (D2D communication) using the SL channels.

In mobile communication systems or networks, like those described above with reference to FIGS. 1A-1B, for example in a LTE or 5G/NR network, the respective entities may communicate using one of more frequency bands. A frequency band includes a start frequency, an end frequency and all intermediate frequencies between the start and end frequencies. In other words, the start, end and intermediate frequencies may define a certain bandwidth, e.g., 20 MHz. A frequency band may also be referred to as a carrier, a bandwidth part, BWP, a subband, and the like. For example, the 5G New Radio (NR) technology supports an operation in unlicensed bands through a technology referred to as NR-based access to unlicensed spectrum (NR-U). The unlicensed spectrum may include bands, e.g., with potential IEEE 802.11 coexistence, such as the 5 GHZ and the 6 GHZ bands. NR-U may support bandwidths that are an integer multiple of 20 MHZ, for example due to regulatory requirements. Each of the 20 MHz bandwidth channels is designed as a subband, and the splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use subbands having subband sizes and nominal frequencies different from the above-described IEEE 802.11 systems. For example, unlicensed subbands may be used, for example, the 24 GHZ band or the 60 GHz band. Examples of such unlicensed subbands include the industrial, scientific and medical, ISM, radio bands reserved internationally for the use of radio frequency energy for industrial, scientific and medical purposes other than telecommunications.

In general, during a wideband operation using unlicensed subbands, for example a transmission spanning more than 20 MHz in the 5 GHz operational unlicensed band, the transmitter, like the gNB or the UE perform LBT separately on each subband, and once the LBT results are available for each subband, the devices, for example, the gNB in the downlink, DL, or the UE in the uplink, UL, are allowed to only transmit on those subbands which are determined to be free or unoccupied, i.e., to transmit on the won subband. For example, in the 5 GHz unlicensed band, the number of 20 MHz subbands used for a wideband operation may be four, so that the overall bandwidth is 80 MHz, however, the number of actually used subbands may differ.

It is noted that the information in the above section is only for enhancing the understanding of the background of the invention and therefore it may contain information that does not form conventional technology that is already known to a person of ordinary skill in the art.

Starting from a conventional technology as described above, when considering a wireless communication system in which data associated with a different services are to be transmitted, an improved HARQ feedback may be desired.

SUMMARY

According to an embodiment, a wireless communication system may have: one or more base stations, and one or more user devices, UEs, wherein the one or more base stations are configured to transmit data to a UE being served by the one or more base stations, the data including control data and user data, the user data including at least first user data and second user data, the first user data associated with a first service and second data associated with second service, the first and second services having one or more different transmission requirements, wherein, responsive to receiving in the control data a grant for a feedback transmission, the UE is configured to send a feedback to the one or more base stations, the feedback indicating for one or more data blocks of the data a successful or non-successful reception at the UE, and wherein the control data includes a first downlink assignment index, DAI, associated with the first data, and a second DAI associated with the second data.

According to another embodiment, a wireless communication system may have: one or more base stations, and one or more user devices, UEs, wherein the base station is configured to transmit data to a UE being served by the base station, the data including control data and user data, wherein, responsive to receiving a grant for a feedback transmission in the control data, the UE is configured to send a feedback to the base station, the feedback indicating for one or more data blocks of the data a successful or non-successful reception at the UE, and wherein the control data includes a last transmission indicator, LTI, the LTI indicating a time since the last transmission of the first and/or second data by the base station.

Another embodiment may have a base station for a wireless communication system, the wireless communication system having one or more base stations and one or more user devices, UEs, wherein the base station is configured to: transmit data to a UE being served by the base station, the data including control data and user data, the user data including at least first user data and second user data, the first user data associated with a first service and second data associated with second service, the first and second services having one or more different transmission requirements, and receive from the UE a feedback, the feedback indicating for one or more data blocks of the data a successful or non-successful reception at the UE, wherein the control data includes a first downlink assignment index, DAI, associated with the first data, and a second DAI associated with the second data.

Another embodiment may have a user device for a wireless communication system, the wireless communication system having one or more base stations and one or more user devices, UEs, wherein the UE is configured to: receive data from one or more base stations serving the UE, the data including control data and user data, the user data including at least first user data and second user data, the first user data associated with a first service and second data associated with second service, the first and second services having one or more different transmission requirements, and responsive to receiving in the control data a grant for a feedback transmission, send a feedback to the one or more base stations, the feedback indicating for one or more data blocks of the data a successful or non-successful reception at the UE, wherein the control data includes a first downlink assignment index, DAI, associated with the first data, and a second DAI associated with the second data.

Another embodiment may have a base station for a wireless communication system, the wireless communication system having one or more base stations and one or more user devices, UEs, wherein the base station is configured to: transmit data to a UE being served by the base station, the data including control data and user data, and receive from the UE a feedback, the feedback indicating for one or more data blocks of the data a successful or non-successful reception at the UE, wherein the control data includes a last transmission indicator, LTI, the LTI indicating a time since the last transmission of the first and/or second data by the base station.

Another embodiment may have a user device for a wireless communication system, the wireless communication system having one or more base stations and one or more user devices, UEs, wherein the UE is configured to: receive data from a base station serving the UE, the data including control data and user data, and responsive to receiving a grant for a feedback transmission in the control data, send a feedback to the base station, the feedback indicating for one or more data blocks of the data a successful or non-successful reception at the UE, wherein the control data includes a last transmission indicator, LTI, the LTI indicating a time since the last transmission of the first and/or second data by the base station.

According to an embodiment a method may have the steps of: transmitting, by one or more base stations of a wireless communication system having one or more base stations and one or more user devices, UEs, data to a UE being served by the one or more base stations, the data including control data and user data, the user data including at least first user data and second user data, the first user data associated with a first service and second data associated with second service, the first and second services having one or more different transmission requirements, and responsive to receiving in the control data a grant for a feedback transmission, sending, by the UE, a feedback to the one or more base stations, the feedback indicating for one or more data blocks of the data a successful or non-successful reception at the UE, a wireless communication system having one or more base stations and one or more user devices, UEs, wherein the control data includes a first downlink assignment index, DAI, associated with the first data, and a second DAI associated with the second data.

According to another embodiment a method may have the steps of: transmitting, by a base station of a wireless communication system having one or more base stations and one or more user devices, UEs, data to a UE being served by the base station, the data including control data and user data, responsive to receiving a grant for a feedback transmission in the control data, sending, by the UE, a feedback to the base station, the feedback indicating for one or more data blocks of the data a successful or non-successful reception at the UE, and wherein the control data includes a last transmission indicator, LTI, the LTI indicating a time since the last transmission of the first and/or second data by the base station.

Another embodiment may have a non-transitory digital storage medium having a computer program stored thereon to perform the method having the steps of: transmitting, by one or more base stations of a wireless communication system including one or more base stations and one or more user devices, UEs, data to a UE being served by the one or more base stations, the data including control data and user data, the user data including at least first user data and second user data, the first user data associated with a first service and second data associated with second service, the first and second services including one or more different transmission requirements, and responsive to receiving in the control data a grant for a feedback transmission, sending, by the UE, a feedback to the one or more base stations, the feedback indicating for one or more data blocks of the data a successful or non-successful reception at the UE, a wireless communication system including one or more base stations and one or more user devices, UEs, wherein the control data includes a first downlink assignment index, DAI, associated with the first data, and a second DAI associated with the second data, when said computer program is run by a computer.

Another embodiment may have a non-transitory digital storage medium having a computer program stored thereon to perform the method having the steps of: transmitting, by a base station of a wireless communication system including one or more base stations and one or more user devices, UEs, data to a UE being served by the base station, the data including control data and user data, responsive to receiving a grant for a feedback transmission in the control data, sending, by the UE, a feedback to the base station, the feedback indicating for one or more data blocks of the data a successful or non-successful reception at the UE, and wherein the control data includes a last transmission indicator, LTI, the LTI indicating a time since the last transmission of the first and/or second data by the base station, when said computer program is run by a computer.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the present invention is now described in more detail with reference to the accompanying drawings in which the same or similar elements have the same reference signs assigned.

Wireless communication systems as above may provide different HARQ reporting procedures. For example, 5G NR may distinguish two different HARQ-ACK feedback reporting procedures, a type-1 and type-2 HARQ-ACK codebook determination. In type-1 HARQ-ACK reporting, which may be signaled by stating that the HARQ-ACK codebook is semi-static, a user device, UE, may report a HARQ-ACK for each PDCCH monitoring occasion, i.e., each time downlink control information is monitored in a transmission to the UE. The HARQ-ACK may be reported in corresponding PUCCH resources, regardless of whether there was a grant in the corresponding PDCCH, the grant was missed, or there was no grant. A grant in the corresponding PDCCH indicates that a HARQ-ACK is to be returned. However, this type of feedback reporting is disadvantageous as it produces a high reporting overhead in the PUCCH, especially in cases where there was no explicit grant for the feedback in the monitored or scanned PDCCH.

To deal with this overhead, 5G NR adopts a type-2 HARQ-ACK reporting procedure which may be activated by stating that the HARQ-ACK-codebook is dynamic. In the type-2 HARQ-ACK reporting, the UE transmit HARQ-ACK information or bits only for actual grants, i.e., only in cases where the PDCCH indicated that a feedback from the UE to the transmitting station is desired. The possible problem of missing a grant is coped with by providing the downlink assignment index, DAI, which may include two two-bit counters in the downlink control information, DCI, namely the DAI counter and the total DAI counter. Note that the DAI counter or total DAI counter in another example does not have to be limited to a two-bit counter, but can be specified to support more than 2 bits, e.g. 3 bits. The DAI counter is incremented for each transmission of user data for which a feedback is desired by the transmitter at a certain occasion or time when a PDCCH is monitored. The total DAI counter signals the number of all transmissions for which a feedback has been requested up to and including the current monitoring time or occasion of the PDCCH.

Figure 3:
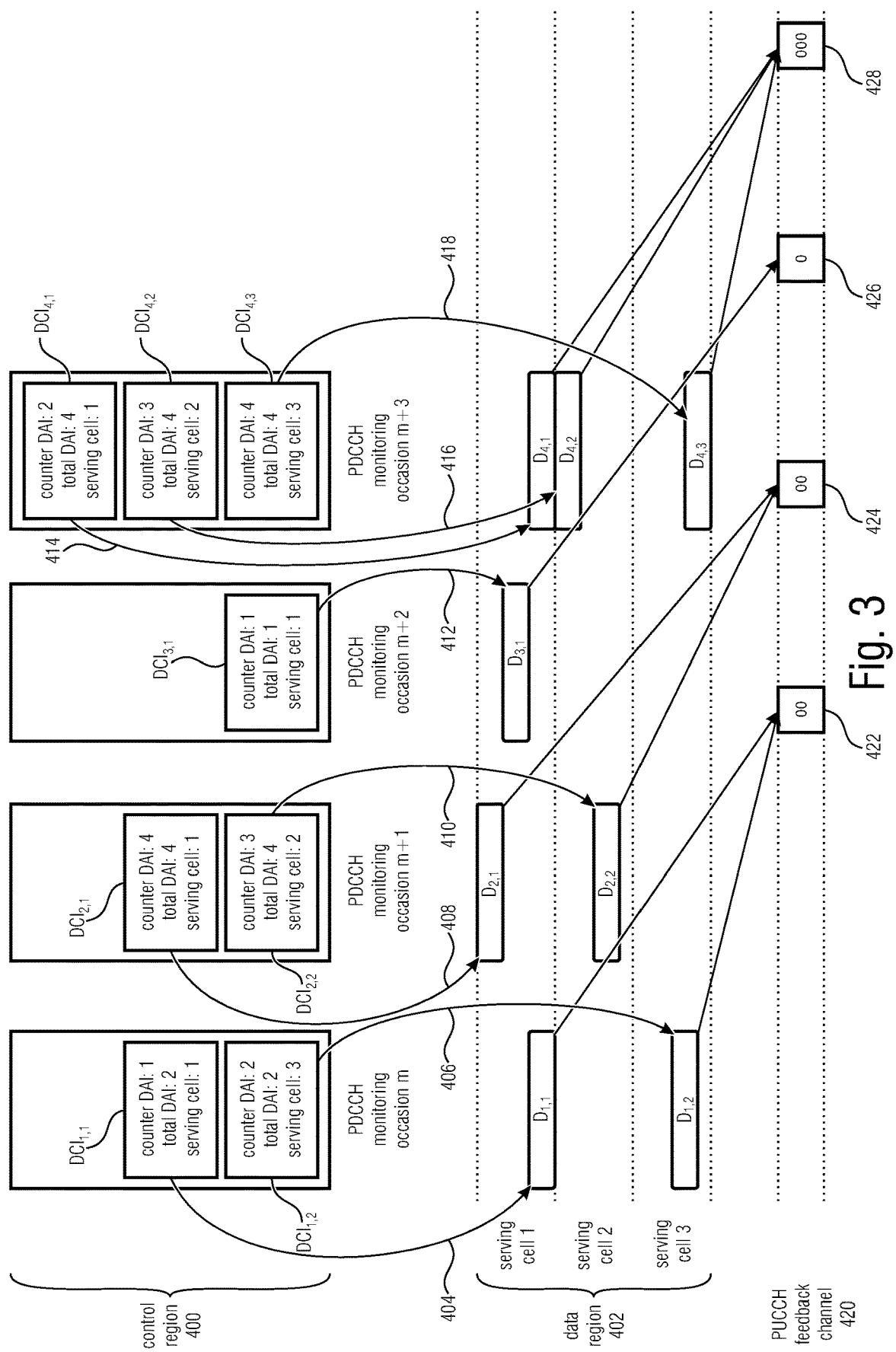
FIG. 3 illustrates the concept of employing the DAI counter and the total DAI counter.

FIG. 3 illustrates the concept of employing the DAI counter and the total DAI counter. FIG. 3 illustrates a control region 400 and a data region 402 including respective data channels. A UE may monitor the control region for DCIs directed to the UE, and in FIG. 3 it is assumed that a receiving UE at times or occasions m to m+3 successfully decodes DCIs dedicated for this UE. At PDCCH monitoring occasion m two DCIs are decoded each including the DAI counter and the total DAI counter and, in addition, an indication of the location where the user data associated with the respective DCI may be found in the data channels. More specifically, $DCI_{1,1}$, as indicated by arrow 404, points to a location in a first subchannel (serving cell 1) of the data channel 420 at which data $D_{1,1}$ associated with the $DCI_{1,1}$ is present, and $DCI_{1,2}$, as indicated by arrow 406, points to a location in a third subchannel (serving cell 3) of the data channel 420 at which data $D_{1,2}$ associated with the $DCI_{1,2}$ is present. Thus, the total number of data transmissions in the data channel 402 indicated in the PDCCH received at time m is 2, so that the total DAI counter has a value of 2. The $DCI_{1,1}$ includes the first data transmission at occasion m so that the DAI counter equals 1, and the $DCI_{1,2}$ includes the second data transmission for which a feedback is desired so that the DAI counter in $DCI_{1,2}$ is 2.

At a later time, the UE derives further DCIs in the control region which are dedicated for the UE, as is indicated at time or occasion m+1. Again, it is assumed that two DCIs dedicated for the UE are present at the PDDCH monitoring occasion m+1, namely $DCI_{2,1}$ and $DCI_{2,2}$ pointing to respective data $D_{2,1}$ and $D_{2,2}$ in the first data channel and in the second data channel (serving cell 2), respectively, as indicated by arrows 408 and 410. As is indicated at PDCCH monitoring occasion m+1, in $DCI_{2,1}$, the DAI counter has been increased to 3 as the transmitter requested for the data $D_{2,2}$ a feedback. Also, a feedback for the data $D_{2,1}$ has been requested so that in $DCI_{2,2}$, the DAI counter has been increased to 4. Further, since the total number of requested feedbacks has now increased to 4, the total DAI counter equals 4.

At an occasion m+2, it is assumed that a further DCI for the UE is decoded, however, at this occasion, namely at PDCCH monitoring occasion m+2 only a single $DCI_{3,1}$ for the UE is present pointing, as is indicating by arrow 412 to data $D_{3,1}$ in the first data channel. At a yet further monitoring occasion m+3, i.e., at a yet later point in time, the UE decodes from the control region 400 the DCIs $D_{4,1}$, $D_{4,2}$ and $D_{4,3}$ pointing, as is indicating by arrows 414, 416 and 418 to data $D_{4,1}$ in the first data channel, data $D_{4,21}$ in the second data channel and $D_{4,3}$ in the third data channel.

In the example of FIG. 3 it is assumed that the maximum value for the counters is 4 and, following further data to be confirmed using a feedback, causes a reset or overflow of the counter to 1. This is depicted in PDCCH monitor occasion m+2, at which the $DCI_{3,1}$ indicates a DAI counter value of 1 as following the fourth data, the counter is reset because one new data packet, which is pointed to arrow 412 is requested to be confirmed using a feedback. At PDCCH monitoring occasion m+3, three additional data packets for which a feedback is requested are indicated in the respective DCIs so that the DAI counters in the respective DCIs are incremented from two to four and, since the overall number of transmissions for which a feedback has been requested is now four, the total DAI counter has a value of four in occasion m+3 while it still has a value of one in occasion m+2 as at this time only a single transmission with requested feedback has been provided.

FIG. 3 further indicates at 420 the PUCCH feedback channel which is used for returning the requested feedback for the respective data packets transmitted at occasions m to m+3. As may be seen, the feedback is transmitted with an offset from the transmission of the data packets, for example at predefined resources allocated for the feedback in the PUCCH. For the data transmission at occasion m, the feedback is transmitted at 422, for the occasion m+1 at 424, for the occasion m+2 at 426 and for the occasion m+3 at 428. In the example of FIG. 3, the feedback includes the values "0", which is assumed to indicate to the transmitter, to which the feedback is returned, that the reception of the data packets at the UE was successful.

Figure 4:
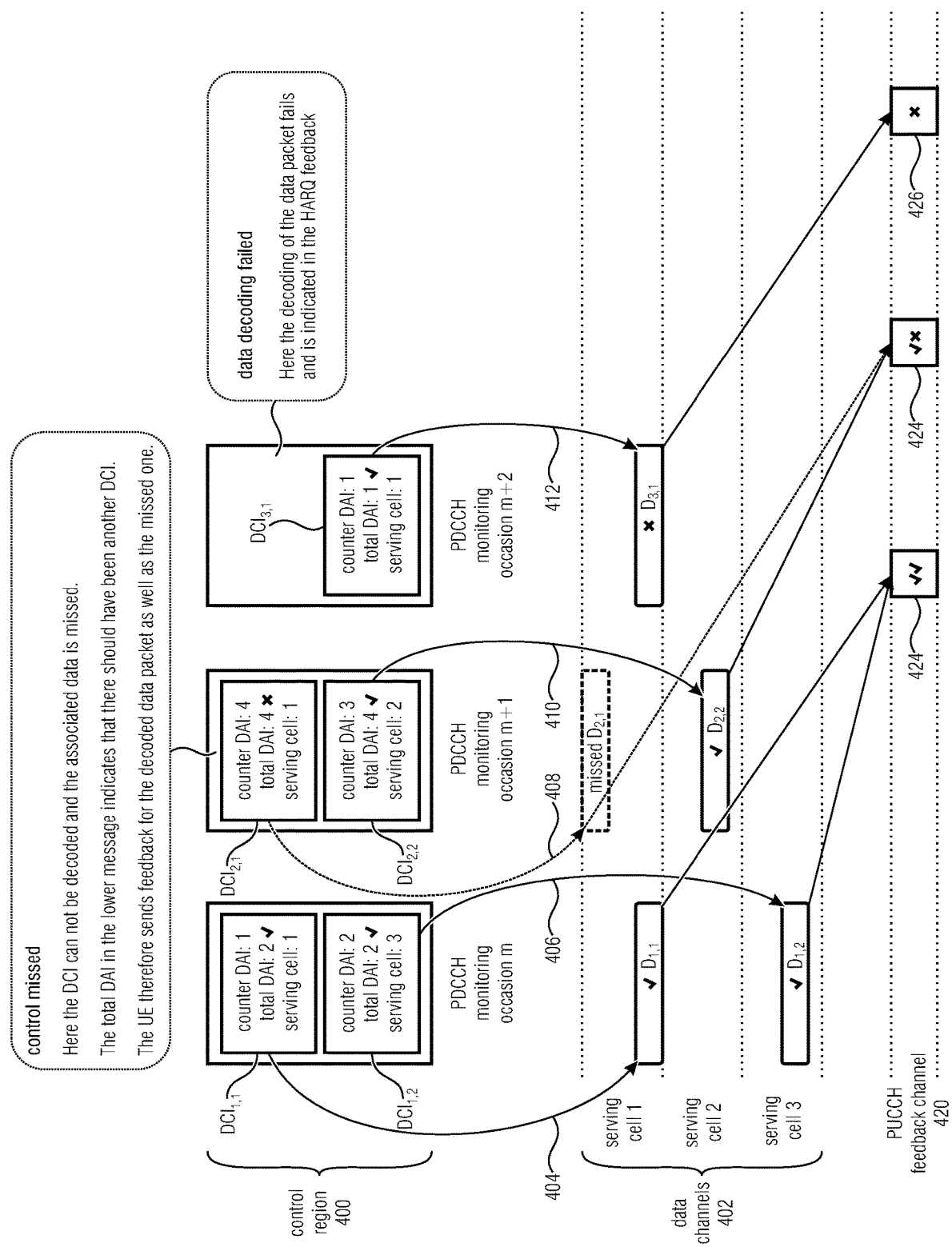
FIG. 4 illustrates an example of how the DAI is used for determining a missed DCI.

FIG. 4 illustrates an example of how the DAI is used for determining a missed DCI. FIG. 4 illustrates the occasions m to m+2 of FIG. 3. At occasion m, it is assumed that the receiving UE was able to detect $DCI_{1,2}$ and $DCI_{2,2}$ which is determined because the DAI counter in $DCI_{1,2}$ has the same value as the total DAI counter. Also a successful decoding of the respective data in the data channels associated with the PDCCH at occasion m is indicated by the respective "✓". At occasion m+1 it is assumed that although the $DCI_{2,1}$ and $DCI_{2,2}$ for the UE were sent, the $DCI_{2,1}$ was missed and, as a consequence, also the data $D_{2,1}$ associated therewith, so that the UE only receives $DCI_{2,1}$. The total DAI counter indicates that, at this time, four data transmissions should have been received, however, the DAI counter value equals 3 indicating that there is one DCI and an associated data transmission missing. Therefore, at occasion 424 a feedback indicating the successful reception of the data $D_{2,1}$ for the $DCI_{2,1}$ is indicated as shown by the "✓", while a missing data is indicated by the "✗"

At occasion m+2, a situation is assumed that the $DCI_{3,1}$ has been successfully decoded at the UE, however, the associated data may not be successfully decoded by the UE, so that, at 426, as the feedback a non-acknowledgment is transmitted back to the transmitter, as is indicated by the "✗".

Figure 5:
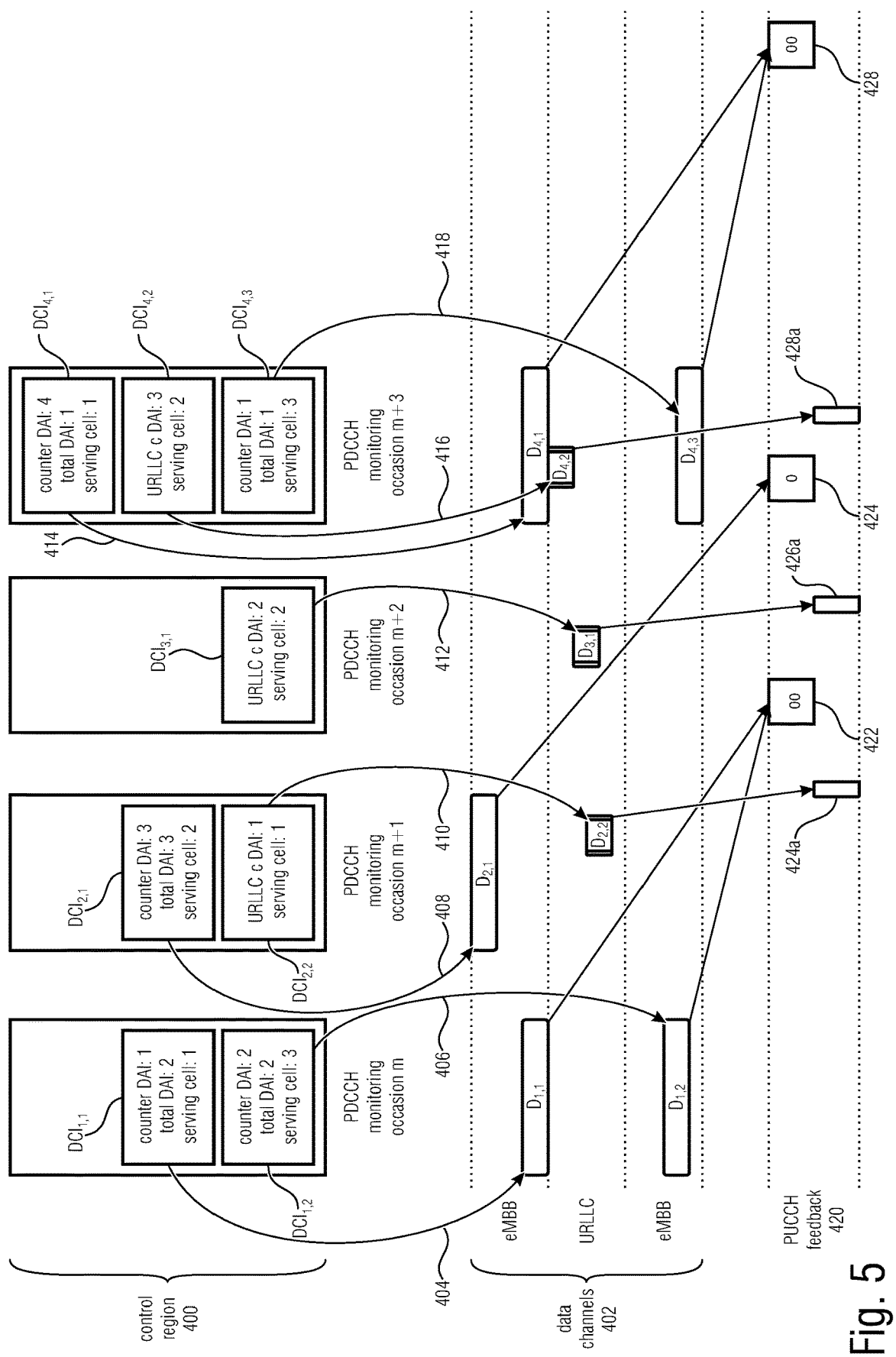
FIG. 5 illustrates an embodiment employing the URLLC DAI of the inventive approach.
Figure 6:
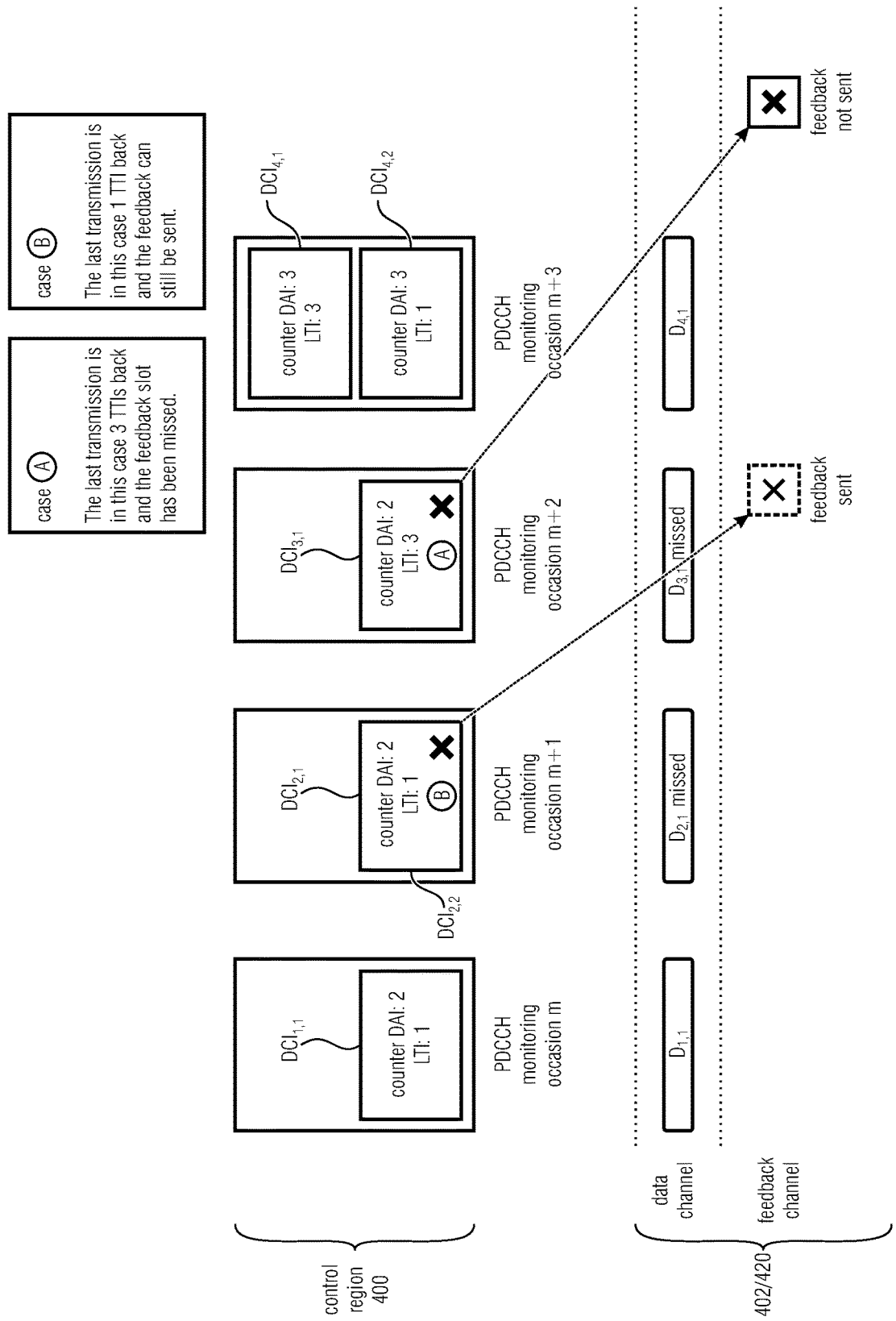
FIG. 6 illustrates an embodiment of the second aspect of the present invention using the inventive last transmission indicator, LTI.

As may be seen from FIGS. 5 and 6, in accordance with conventional approaches, the feedback transmitted in the PUCCH feedback channel 420 occurs for respective data transmitted at occasions m, m+1 and m+2 with a substantial offset from these occasions which may cause an increase in latency until correct data is transmitted to a UE which may not be acceptable for data associated with services requiring a low latency or which are delay critical, like URLLC services. Stated differently, while the process as depicted above with reference to FIGS. 5 and 6 is not problematic in terms of latency for data packets associated with services not being time critical, like eMBB services, it may not be sufficient for URLLC services.

The present invention addresses this issue by providing, in accordance with an aspect, different DAIs associated with data packets of different services, so that time-uncritical data packets may be handled differently than time critical data packets, in terms of when providing the feedback. In accordance with another aspect, the inventive approach provides a so-called last transmission indicator, LTI, field in the DCI which indicates the offset from the last DCI which granted the resources for the feedback in the uplink channel so as to allow the UE to determine the timing of the last transmission although it missed the associated grant, and in such cases, the UE may employ one or more existing parameters for trying to decode information or to perform an uplink transmission.

Figure 1A:
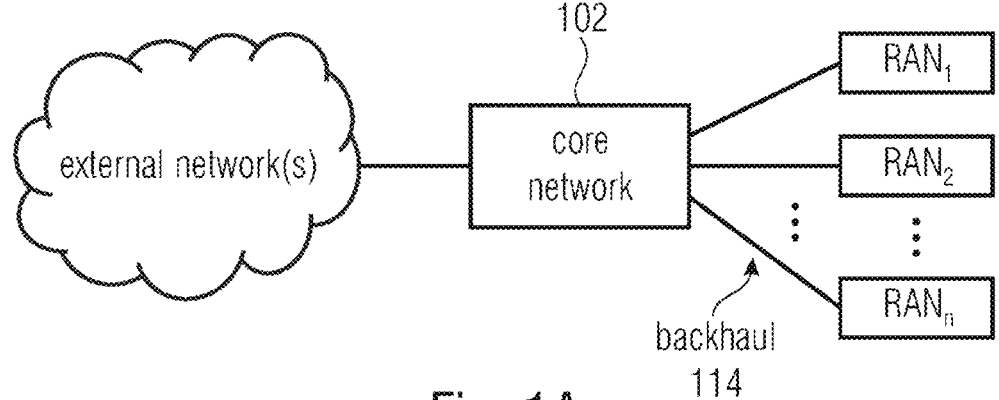
FIGS. 1A-1B show schematic representation of an example of a wireless communication system.
Figure 1B:
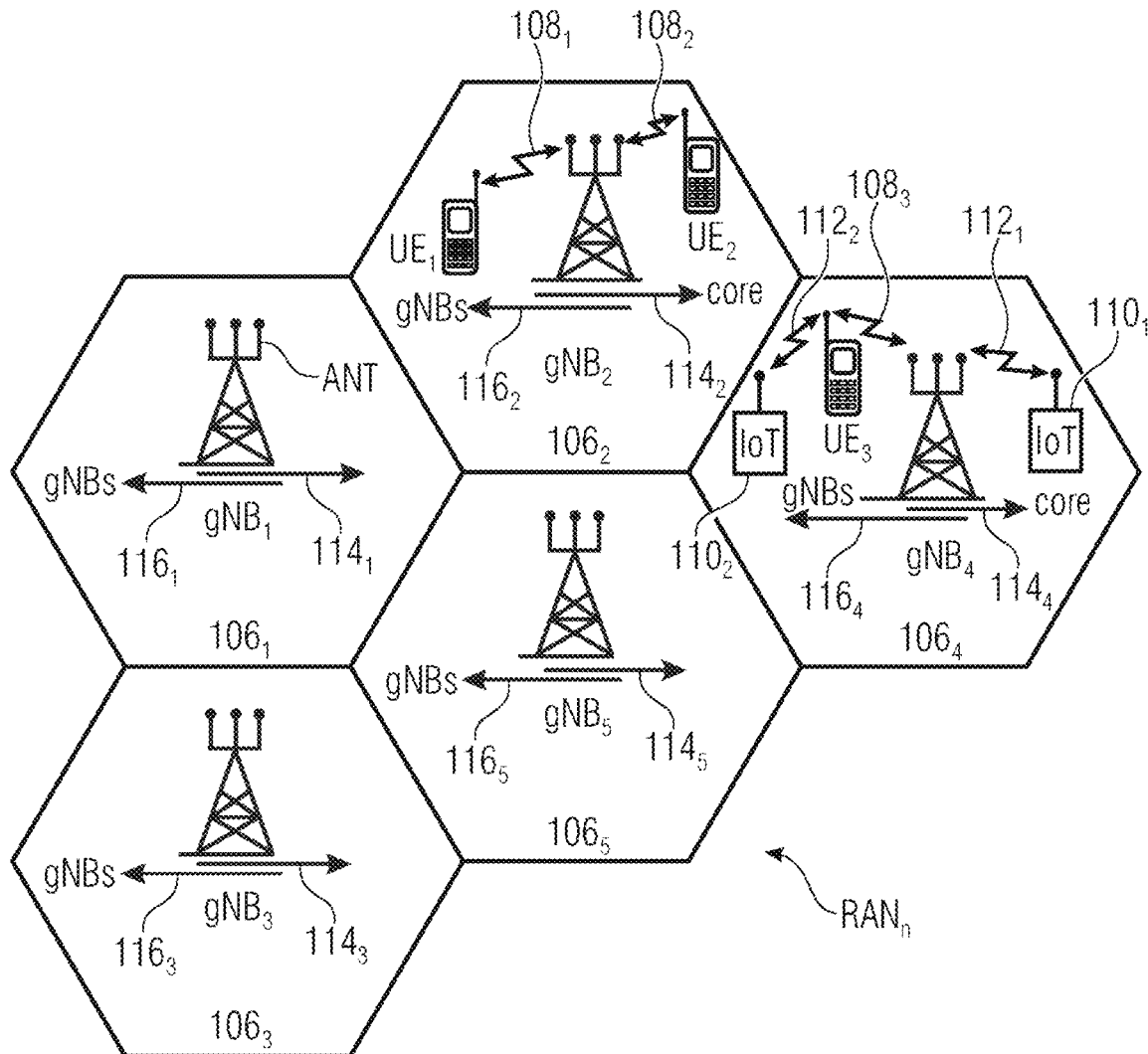
Figure 2:
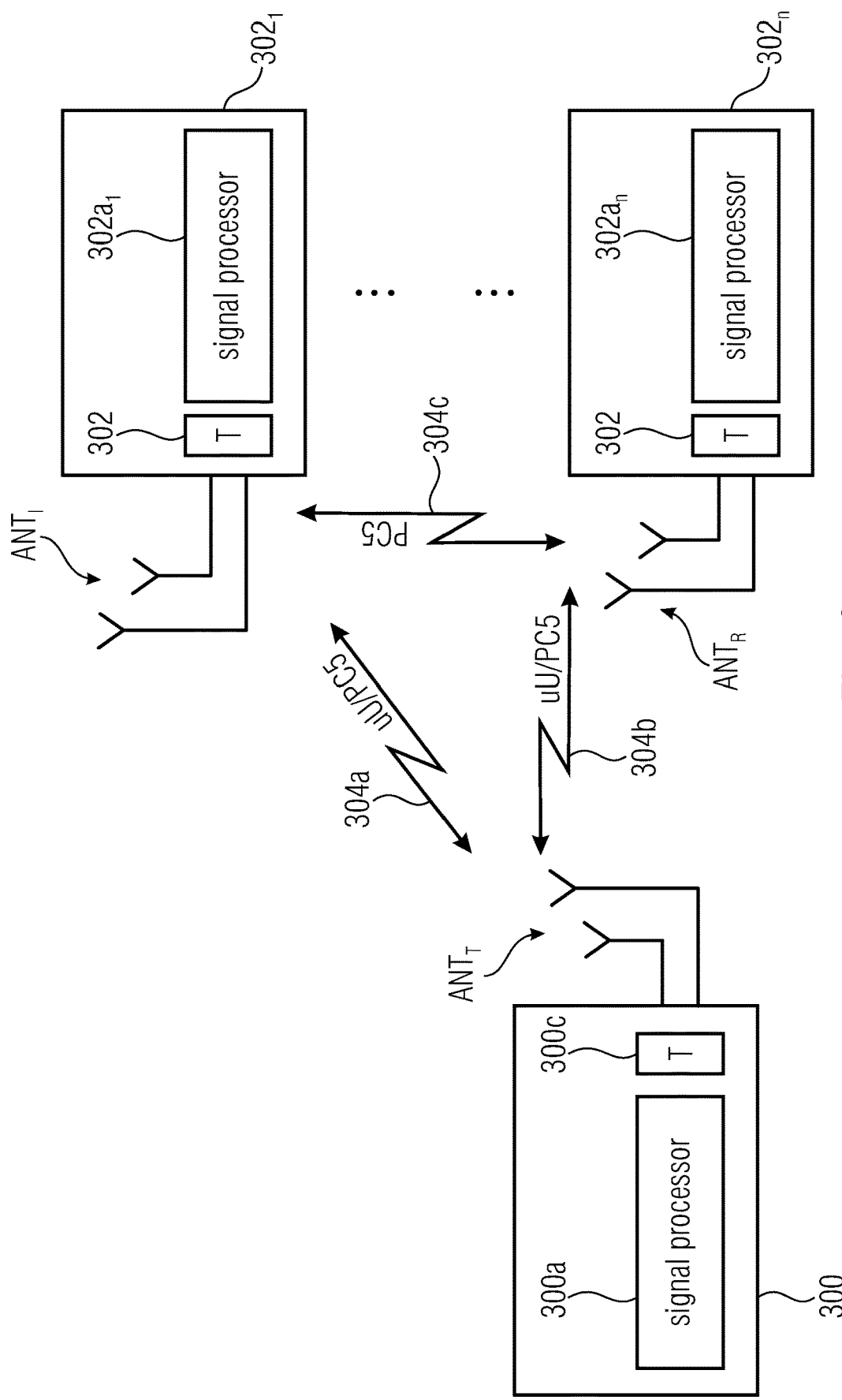
FIG. 2 is a schematic representation of a wireless communication system for communicating information between a transmitter and one or more receivers in accordance with embodiments of the present invention.

Stated differently, the present invention aims at providing a more reliable communication of latency critical data to a UEs by using a dedicated DAI and/or LTI allowing for a quicker transmission of the feedback, thereby causing an earlier retransmission for the latency critical data, or by giving the UE the opportunity to obtain the latency critical data using existing parameters, in case the missed transmission is not too far in the past. This is addressed by the present invention as described hereinbelow in more detail, and embodiments of the present invention may be implemented in a wireless communication system as depicted in FIGS. 1A-1B including base stations and users, like mobile terminals or IoT devices. FIG. 2 is a schematic representation of a wireless communication system including a transmitter 300, like a base station, and one or more receivers $302_1$ to $302_n$, like user devices, UEs. The transmitter 300 and the receivers 302 may communicate via a wireless communication links or channels 304a, 304b, 304c, like a radio link. The transmitter 300 may include one or more antennas $ANT_T$ or an antenna array having a plurality of antenna elements, a signal processor 300a and a transceiver 300b, coupled with each other. The receivers 302 include one or more antennas $ANT_R$ or an antenna array having a plurality of antennas, a signal processor $302a_1$, $302a_n$, and a transceiver $302b_1$, $302b_n$, coupled with each other. The base station 300 and the UEs 302 may communicate via respective first wireless communication links 304a and 304b, like a radio link using the Uu interface, while the UEs 302 may communicate with each other via a second wireless communication link 304c, like a radio link using the PC5 sidelink interface.

The system, the base station 300 and the one or more UEs 302 may operate in accordance with the inventive teachings described herein.

System Using Two DAIs

The present invention provides (see for example claim 1), a wireless communication system, comprising
one or more base stations, and
one or more user devices, UEs,
wherein the base station is configured to transmit data to a UE being served by the base station, the data including control data and user data, the user data including at least first user data and second user data, the first user data associated with a first service and second data associated with second service, the first and second services having one or more different transmission requirements,
wherein, responsive to receiving in the control data a grant for a feedback transmission, the UE is configured to send a feedback to the base station, the feedback indicating for one or more data blocks of the data a successful or non-successful reception at the UE, and
wherein the control data includes a first downlink assignment index, DAI, associated with the first data, and a second DAI associated with the second data.

In other words, control data may include different DAIs, like an eMBB DAI and an URLLC DAI, and the data blocks of data may be control information if data is control data or data if the data is user data.

In accordance with embodiments (see for example claim 2), the user data includes third data, the third user data associated with a third service, and the control data includes a third DAI associated with the third data.

In accordance with embodiments (see for example claim 3), the user data includes third data, the third user data associated with a third service, and wherein the first DAI is associated with the first and third data, or the second DAI is associated with the second and third data.

In accordance with embodiments (see for example claim 4), the control data points to data and a feedback resource mapping for sending the feedback is
explicit, or
implicit, or
semi-statically preconfigured.

In accordance with embodiments (see for example claim 5), the UE is configured to monitor a plurality of control regions in a received signal for the control data, wherein a control region indicates the transmission of one or more data blocks of user data.

In accordance with embodiments (see for example claim 6), the first and second DAIs are incremented independently, the first DAI being incremented responsive to sending first data to the UE, and the second DAI being incremented responsive to sending second data to the UE.

In accordance with embodiments (see for example claim 7), the first and second transmission parameters include one or more of latency, reliability, packet size, QoS, service type.

In accordance with embodiments (see for example claim 8), the UE is configured to send the feedback for data associated with the first service during a first interval following the transmission of the user data, and the feedback for data associated with the second service during a second interval following the transmission of the user data, the second interval being shorter than the first interval.

In accordance with embodiments (see for example claim 9),
the first DAI includes a counter value being incremented for each user data transmission associated with the first service for the UE, and a total value indicating the number of user data transmissions of the first services up to and including a current control region, and
the second DAI includes a counter value being incremented for each transmission of data associated with the second service for the UE.

In accordance with embodiments (see for example claim 10),
the first DAI includes a counter value being incremented for each user data transmission associated with the first service for the UE, and a first total value indicating the number of user data transmissions of the first service up to and including a current control region, and the second DAI includes a counter value being incremented for each user data transmission associated with the second service for the UE, and a second total value indicating the number of user data transmissions of the second service up to and including a current control region.

In accordance with embodiments (see for example claim 11), the control data in a control region includes one or more first control messages associated with the first user data and one or more second control messages associated with the second user data, the first control message including the first DAI and the second control message including the second DAI, In accordance with embodiments (see for example claim 12), the control data in a control region includes one or more control messages associated with the first user data and including the first DAI and the second DAI.

In accordance with embodiments (see for example claim 13),
the control data further includes a last transmission indicator, LTI, the LTI indicating the time since a last transmission of the first and/or second data by the base station, and
the UE is configured to determine the time of the last data transmission of data by the base station using the LTI, and to send the feedback in case the time since the last transmission of data by the base station is below a predefined threshold.

In accordance with embodiments (see for example claim 14), the UE is configured to
use pre-configured UE-specific uplink resources for reporting the feedback,
detect, using the second DAI and/or the LTI, a missed transmission of data by the base station, and
send the feedback if a time for the uplink of the feedback using the UE-specific uplink resources has not passed at the time of detecting the missed transmission.

In accordance with embodiments (see for example claim 15), responsive to detecting a missed transmission of user data and in case a time passed since a last transmission as indicated by the LTI is below a predefined threshold, the UE is configured to blind decode the missed transmission using one or more previous parameters, e.g., using the same frequency resources and MCS level, using the same frequency resources and trying a different MCS level, or using the same MSC level and trying different frequency resources.

In accordance with embodiments (see for example claim 16), responsive to detecting a missed transmission of control data and in case a time passed since a last transmission as indicated by the LTI is below a predefined threshold, the UE is configured to perform a transmission of uplink data using one or more previous parameters, e.g., using the same frequency resources and MCS level, using the same frequency resources and trying a different MCS level, or using the same MSC level and trying different frequency resources.

System Using LTI

The present invention provides (see for example claim 17) a wireless communication system, comprising
one or more base stations, and
one or more user devices, UEs,
wherein the base station is configured to transmit data to a UE being served by the base station, the data including control data and user data,
wherein, responsive to receiving a grant for a feedback transmission in the control data, the UE is configured to send a feedback to the base station, the feedback indicating for one or more data blocks of the data a successful or non-successful reception at the UE, and
wherein the control data includes a last transmission indicator, LTI, the LTI indicating a time since the last transmission of the first and/or second data by the base station.

In other words, control data may include a LTI, and the data blocks of data may be control information if data is control data or data if the data is user data.

In accordance with embodiments (see for example claim 18), the UE is configured to determine the time of the last transmission of data by the base station using the LTI, and to send the feedback in case the time since the last the last transmission of data by the base station is below a predefined threshold.

In accordance with embodiments (see for example claim 19), the UE is configured to
use pre-configured UE-specific uplink resources for reporting the feedback,
detect, using the LTI, a missed transmission of data by the base station, and
send the feedback if a time for the uplink of the feedback using the UE-specific uplink resources has not passed at the time of detecting the missed transmission.

In accordance with embodiments (see for example claim 20), responsive to detecting a missed transmission of user data and in case a time passed since a last transmission as indicated be the LTI is below a predefined threshold, the UE is configured to blind decode the missed transmission using previous parameters, e.g., using the same frequency resources and MCS level, using the same frequency resources and trying a different MCS level, or using the same MSC level and trying different frequency resources.

In accordance with embodiments (see for example claim 21), responsive to detecting a missed transmission of control data and in case a time passed since a last transmission as indicated by the LTI is below a predefined threshold, the UE is configured to perform a transmission of uplink data using previous parameters, e.g., using the same frequency resources and MCS level, using the same frequency resources and trying a different MCS level, or using the same MSC level and trying different frequency resources.

In accordance with embodiments (see for example claim 22), the control data includes a downlink assignment index, DAI.

In accordance with embodiments (see for example claim 23), the control data includes one or more total downlink assignment indexes, total DAI.

In accordance with embodiments (see for example claim 24), the UE comprises one or more of
a mobile terminal, or
stationary terminal, or.
cellular IoT-UE, or
vehicular UE, or.
an IoT or narrowband IoT, NB-IoT, device, or.
a ground based vehicle, or.
an aerial vehicle, or
a drone, or.
a moving base station, or
road side unit, or
a building, or.

any other item or device provided with network connectivity enabling the item/device to communicate using the wireless communication network, e.g., a sensor or actuator, and
the base station comprises one or more of
a macro cell base station, or
a small cell base station, or
a central unit of a base station, or
a distributed unit of a base station, or
a road side unit, or
a UE, or
a remote radio head, or
an AMF, or
an SMF, or
a core network entity, or
mobile edge computing entity, or
a network slice as in the NR or 5G core context, or
any transmission/reception point, TRP, enabling an item or a device to communicate using the wireless communication network, the item or device being provided with network connectivity to communicate using the wireless communication network.

Base Station and UE Using Two DAIs

The present invention provides (see for example claim 25), base station for a wireless communication system, the wireless communication system comprising one or more base stations and one or more user devices, UEs, wherein the base station is configured to
transmit data to a UE being served by the base station, the data including control data and user data, the user data including at least first user data and second user data, the first user data associated with a first service and second data associated with second service, the first and second services having one or more different transmission requirements, and
receive from the UE a feedback, the feedback indicating for one or more data blocks of the data a successful or non-successful reception at the UE,
wherein the control data includes a first downlink assignment index, DAI, associated with the first data, and a second DAI associated with the second data.
The present invention provides (see for example claim 26), a user device for a wireless communication system, the wireless communication system comprising one or more base stations and one or more user devices, UEs, wherein the UE is configured to
receive data from a base station serving the UE, the data including control data and user data, the user data including at least first user data and second user data, the first user data associated with a first service and second data associated with second service, the first and second services having one or more different transmission requirements, and
responsive to receiving in the control data a grant for a feedback transmission, send a feedback to the base station, the feedback indicating for one or more data blocks of the data a successful or non-successful reception at the UE,
wherein the control data includes a first downlink assignment index, DAI, associated with the first data, and a second DAI associated with the second data.
In accordance with embodiments (see for example claim 27), the control data points to data and a feedback resource mapping for sending the feedback is
explicit, or
implicit, or
semi-statically preconfigured.

Base Station and UE Using LTI

The present invention provides (see for example claim 28), a base station for a wireless communication system, the wireless communication system comprising one or more base stations and one or more user devices, UEs, wherein the base station is configured to
transmit data to a UE being served by the base station, the data including control data and user data, and
receive from the UE a feedback, the feedback indicating for one or more data blocks of the data a successful or non-successful reception at the UE,
wherein the control data includes a last transmission indicator, LTI, the LTI indicating a time since the last transmission of the first and/or second data by the base station.
The present invention provides (see for example claim 29), a user device for a wireless communication system, the wireless communication system comprising one or more base stations and one or more user devices, UEs, wherein the UE is configured to
receive data from a base station serving the UE, the data including control data and user data, and
responsive to receiving a grant for a feedback transmission in the control data, send a feedback to the base station, the feedback indicating for one or more data blocks of the data a successful or non-successful reception at the UE,
wherein the control data includes a last transmission indicator, LTI, the LTI indicating a time since the last transmission of the first and/or second data by the base station.
In accordance with embodiments (see for example claim 30), the control data points to data and a feedback resource mapping for sending the feedback is
explicit, or
implicit, or
semi-statically preconfigured.

Methods

The present invention provides (see for example claim 31), a method, comprising
transmitting, by a base station of a wireless communication system having one or more base stations and one or more user devices, UEs, data to a UE being served by the base station, the data including control data and user data, the user data including at least first user data and second user data, the first user data associated with a first service and second data associated with second service, the first and second services having one or more different transmission requirements, and
responsive to receiving in the control data a grant for a feedback transmission, sending, by the UE, a feedback to the base station, the feedback indicating for one or more data blocks of the data a successful or non-successful reception at the UE, a wireless communication system having one or more base stations and one or more user devices, UEs,
wherein the control data includes a first downlink assignment index, DAI, associated with the first data, and a second DAI associated with the second data.
The present invention provides (see for example claim 32), a method, comprising transmitting, by a base station of a wireless communication system having one or more base stations and one or more user devices, UEs, data to a UE being served by the base station, the data including control data and user data, responsive to receiving a grant for a feedback transmission in the control data, sending, by the UE, a feedback to the base station, the feedback indicating for one or more data blocks of the data a successful or non-successful reception at the UE, and wherein the control data includes a last transmission indicator, LTI, the LTI indicating a time since the last transmission of the first and/or second data by the base station.

Computer Program Product

The present invention provides a computer program product comprising instructions which, when the program is executed by a computer, causes the computer to carry out one or more methods in accordance with the present invention.

In accordance with a first aspect of the present invention, embodiments provide at least one new DAI for time critical transmissions, like URLLC transmissions. FIG. 5 illustrates an embodiment employing the URLLC DAI of the inventive approach. FIG. 5 illustrates, in a similar way as FIGS. 5 and 6 the control region 400, the data channels 402 and the feedback channel 420 as well as the DCIs decoded by a receiving UE at respective PDCCH monitoring occasions m to m+3. The PDCCH monitoring occasion m indicates the $DCI_{1,2}$ and the $DCI_{2,2}$ in similar way as in FIG. 3 and FIG. 4, however, in accordance with the inventive approach, the $DCI_{1,2}$ and the $DCI_{2,2}$ are considered to be associated with first data being non-time critical, for example data associated with an eMBB service. At PDCCH monitoring occasion m+1, a $DCI_{2,1}$ for a third data packet associated with the eMBB service is indicated, as well as a $DCI_{2,2}$ including the inventive URLLC DAI counter indicating that the $DCI_{2,2}$ is associated with a time critical data packet of a URLLC service. The $DCI_{2,2}$ indicates a DAI counter of three and a total number of DAI also being three, indicating that at occasion m+1, all DCIs associated with the eMBB service have been received and successfully decoded, so that the feedback at 424 signals this accordingly to the transmitter. At PDCCH monitoring location m+1, as mentioned, also the URLLC DAI is received indicating to the UE that for the data associated with $DCI_{2,1}$ the feedback is to be transmitted at an offset from the transmission of the actual data which is less than offset for the eMBB data, as is indicated at 424a. At PDCCH monitoring occasion m+2, the UE decodes a $DCI_{3,1}$ which is again associated with the URLLC data so that an early feedback is provided in the feedback channel 420, as is indicated at 426a. At PDCCH monitor occasion m+3, the $DCI_{4,1}$ and $DCI_{4,3}$ are associated with eMBB data and the $DCI_{4,2}$ is associated again URLLC data so that the feedback for the URLLC data is provided immediately after reception of the data at 428a.

Thus, embodiments of the first aspect of the present invention allow a receiving UE to provide feedback for latency critical data independent from non-latency critical data so that for such data an early feedback is provided improving the reliability of the transmission of the time critical data.

The present invention is not limited to the embodiments described above. In accordance with further embodiments, the user data may include third data with a third service, and the control data includes a third DAI associated with the third data. For example, the second and third services may both be URLLC services with low latency and different reliability requirements. In accordance with other embodiments, the first DAI is associated with the first and third data, or the second DAI is associated with the second and third data.

As described above, the control data points to the data and a feedback resource mapping for sending the feedback may be explicit, or may be implicit, or may be semi-statically preconfigured. In accordance with further embodiments of the first aspect, the inventive concept using different DAIs associated with data packets of different services may be also employed for multi-TRP (transmit/receive point) scenarios, e.g., Multi-TRP in MIMO (Multiple Input Multiple Output). In such scenarios the different services may be different TRPs from which a user device may receive respective user data, e.g., first user data from a first service or TRP and second data from a second service or TRP. The first and second TRPs may provide the respective data using different transmission requirements. Naturally, the data may be provided by more than two TRPs.

The two or more TRPs may be different bases stations in the wireless communication system and/or different or independent antennas or antenna arrays of one or more base stations in the wireless communication system. The respective TRPs provide one or more beams for transmitting the respective data to the user device, e.g., in case of two TRPs, the first TRP may use one or more beams for transmitting the first user data from a base station to the user device, and the second TRP may use one or more beams for transmitting the second user data from the same base station of from a different base station to the user device.

When transmitting the data in the above described way, a feedback mechanism indicting successful/non-successful receipt of the data at the user device, UE, may be implemented. For example, for a separate feedback, like a separate ACK/NACK feedback, for PDSCHs received from the different TRPs, the UE may generate separate ACK/NACK codebooks. For the separate feedback, different DAIs, i.e., DAIs associated with data or data packets provided by the different services/TRPs may be provided.

Thus, in accordance with embodiments, a wireless communication system is provided that includes one or more base stations, and one or more user devices, UEs. The one or more base stations transmit data to a UE being served by the one or more base stations and the data includes control data and user data. The user data includes at least first user data and second user data. The first user data is associated with a first service, like a first TRP at the base station, and the second data is associated with second service, like a second TRP at the base station or at another base station. The first and second services, like the first and second TRPs, have one or more different transmission requirements. Responsive to receiving in the control data a grant for a feedback transmission, the UE is configured to send a feedback to the base station (in case the TRPs are at the same base station) or to the base station and to the other base station (incase the TRPs are at different base stations). The feedback indicates for one or more data blocks of the data a successful or non-successful reception at the UE. The control data includes a first downlink assignment index, DAI, associated with the first data, and a second DAI associated with the second data. The first and second DAI may be transmitted in a same or different control messages. For example, the DCI scheduling the data may either include only the respective DAI or both DAIs.

A user device, UE, for such a wireless communication system may receive data from one or more base stations serving the UE. The data includes control data and user data. The data includes the first user data and the second user data. Responsive to receiving a grant for a feedback transmission in the control data, the UE sends a feedback to the one or more base station, e.g., to one base station (in case the TRPs are at the same base station) or to one base station and to another base station (incase the TRPs are at different base stations). The control data includes the first downlink assignment index, DAI, associated with the first data, and the second DAI associated with the second data.

In accordance with further embodiments of the first aspect, the inventive concept using different DAIs associated with data packets of different services may be also employed for sidelink scenarios, e.g., V2X. In such scenarios the different services may be different data flows with different quality of service, QoS, requirements from which a user device may transmit respective user data, e.g., first user data from a first service and second data from a second service. The first and second TRPs may provide the respective data using different transmission procedures, e.g. HARQ-based transmission or HARQ-less transmission, e.g. k-repetition. Naturally, the data may be provided by more than two services.

Embodiments of a second aspect of the present provide the so-called last transmission indicator, LTI, in accordance with which the base station indicates in the DCI the time of the last request for a feedback, for example, the slot number, either in absolute or relative values, of the last grant, so that the receiving UE may determine the timing of the last transmission even in case the actual grant or DCI message has been missed. FIG. 6 illustrates an embodiment of the second aspect of the present invention using the above-mentioned last transmission indicator, LTI. FIG. 6, illustrates the control region 400, the data channel 420 and the feedback channel 424. In the example depicted in FIG. 6, it is assumed that type-1 HARQ-ACK reporting is employed using only the DAI counter. However, other embodiments may employ type-2 HARQ-ACK reporting. A situation is depicted in which a UE receives at certain occasions m to m+4 DCIs dedicated for the receiving UE. At occasion m, a $DCI_{1,1}$ is received having a DAI counter value of 1 indicating that in the associated data channel a data packet is present. The data or data packet may be any kind of data, e.g., a latency critical data packet or a non-latency critical data packet. The DCI includes the inventive LTI field which is set to 1 meaning that the last transmission of a DCI was, e.g., at occasion m−1 (not shown). At PDCCH occasion m+1, the $DCI_{2,1}$ indicates that a second data packet is transmitted, and the LTI indicates that the last transmission is one TTI back in time. Further, it is assumed that the data packet was missed, i.e., may not be decoded at the UE, however, since the last transmission was only one TTI back (e.g., at occasion m), the feedback may still be sent indicating a non-acknowledgement, NACK. At the occasion m+3, the DCI indicates that for the missed data associated with the $DCI_{3,1}$, the last transmission was three TTIs back, so that the scheduled feedback in the feedback channel has already passed, so that no feedback may be sent.

In accordance with embodiments, more than one LTI may be included, each LTI being associated with different data.

In accordance with embodiments of the inventive approach, the first and second aspects may be combined, i.e., the LTI may be used also for the DCIs in accordance with the above described first aspect.

In accordance with further embodiments, the base station may include the URLLC DAI and/or the LTI into the eMBB DCIs so that the UE may also detect missed URLLC transmissions based on eMBB DCIs.

In accordance with further embodiments the UE may be configured with UE-specific URLLC PUCCH resources, as indicated above with reference to FIG. 5 which may depend on a UE-specific configuration. The configuration may be set using an RRC signaling or based on a UE-ID and the timing of the transmission. Based on the URLLC DAI and/or the LTI, the UE may detect a missed transmission and report a non-acknowledgment in case the corresponding PUCCH slot scheduled for the feedback has not passed at the point of detection of the missing transmission. Hence, the base station may easily detect that the UE missed the transmission and provide a retransmission within a latency constraint.

In accordance with further embodiments, in case the UE detects a missed PDCCH or DCI based on the DAI and/or the LTI early enough, i.e., within a time below a certain threshold following the actual transmission, the UE may blind decode the corresponding transmission using one or more previous parameters, e.g., using the same frequency resources and MCS level, using the same frequency resources and trying a different MCS level, or using the same MSC level and trying different frequency resources. For example, the UE may use resources/parameters for which the last CSI report indicated good reception. The CSI may also be a CQI or in case of MIMO the PMI (precoder matrix indicator) or RI (rank indicator). In accordance with further embodiments, the UE may also perform a transmission in the uplink using one or more previous parameters as stated above.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a UE may comprise one or more of a mobile or stationary terminal, an IoT device, a ground based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 7:
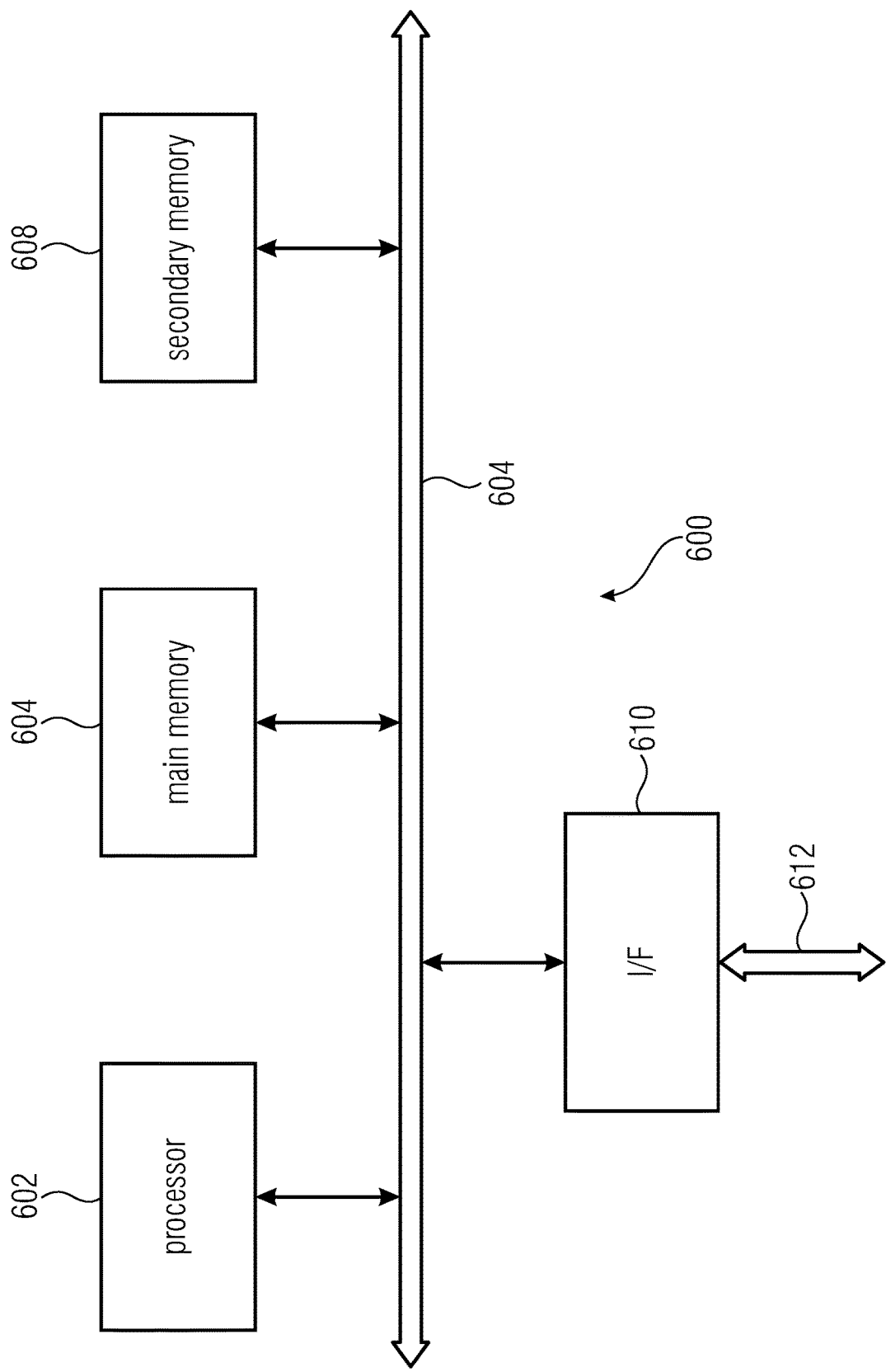
FIG. 7 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 7 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

| LIST OF ACRONYMS AND SYMBOLS | |
|---|---|
| V2X | Vehicle-to-Everything |
| 3GPP | Third Generation Partnership Project |
| D2D | Device-to-Device |
| ITS | Intelligent Transport Services |
| FR1, FR2 | Frequency Range Designations |
| BS | Base Station |
| eNB | Evolved Node B (3G base station) |
| UE | User Equipment |
| SL | Sidelink |
| V2V | Vehicle-to-Vehicle |
| SCS | Sub Carrier Spacing |
| RB | Resource Block |
| PSCCH | Physical Sidelink Control Channel |
| PSSCH | Physical Sidelink Shared Channel |
| TTI | Transmit Time Interval |
| SCI | Sidelink Control Information |
| DCI | Downlink Control Information |
| CP | Cyclic Prefix |
| BWP | Bandwidth Part |
| CORESET | Control Resource Set |
| USS | UE-Specific Search Space |
| CSS | Common Search Space |
| RP | Resource Pool |
| URLLC | Ultra Reliable Low Latency Communication |

The invention claimed is:

1. A user device (UE) for a wireless communication system, the wireless communication system comprising one or more base stations, and
one or more user devices (UEs), wherein the UE is configured to:
receive data from a base station serving the UE, the data comprising control data and user data, the user data comprising at least first user data and second user data, the first user data associated with a first service and the second data associated with a second service, the first and second services comprising one or more different transmission requirements,
responsive to receiving in the control data a grant for a feedback transmission, send a feedback to the base station, the feedback indicating for one or more data blocks of the data a successful or non-successful reception at the UE, and
wherein the control data comprises a first downlink assignment index, DAI, associated with the first user data, and a second DAI associated with the second user data.

2. The user device (UE) of claim 1, wherein the user data further comprises third user data, the third user data associated with a third service, and the control data comprises a third DAI associated with the third user data.

3. The user device (UE) of claim 1, wherein the user data further comprises third user data, the third user data associated with a third service, and wherein the first DAI is associated with the first and third user data, or the second DAI is associated with the second and third user data.

4. The user device (UE) of claim 1, wherein the control data points to data and a feedback resource mapping for sending the feedback is
explicit, or
implicit, or
semi-statically preconfigured.

5. The user device (UE) of claim 1, wherein the UE is configured to monitor a plurality of control regions in a received signal for the control data, wherein a control region indicates the transmission of one or more data blocks of user data.

6. The user device (UE) of claim 1, wherein the first and second DAIs are incremented independently, the first DAI being incremented responsive to sending first user data to the UE, and the second DAI being incremented responsive to sending second user data to the UE.

7. The user device (UE) of claim 1, wherein the first and second transmission parameters comprise one or more of latency, reliability, packet size, QoS, service type.

8. The user device (UE) of claim 1, wherein the UE is configured to send the feedback for data associated with the first service during a first interval following the transmission of the user data, and the feedback for data associated with the second service during a second interval following the transmission of the user data, the second interval being shorter than the first interval.

9. The user device (UE) of claim 1, wherein:
the first DAI comprises a counter value being incremented for each user data transmission associated with the first service for the UE, and a total value indicating the number of user data transmissions of the first services up to and comprising a current control region, and
the second DAI comprises a counter value being incremented for each transmission of data associated with the second service for the UE.

10. The user device (UE) of claim 1, wherein
the first DAI comprises a counter value being incremented for each user data transmission associated with the first service for the UE, and a first total value indicating the number of user data transmissions of the first service up to and comprising a current control region, and
the second DAI comprises a counter value being incremented for each user data transmission associated with the second service for the UE, and a second total value indicating the number of user data transmissions of the second service up to and comprising a current control region.

11. The user device (UE) of claim 1, wherein the control data in a control region comprises one or more first control messages associated with the first user data and one or more second control messages associated with the second user data, the first control message comprising the first DAI and the second control message comprising the second DAI.

12. The user device (UE) of claim 1, wherein the control data in a control region comprises one or more control messages associated with the first user data and comprising the first DAI and the second DAI.

13. The user device (UE) of claim 1, wherein:
the control data further comprises a last transmission indicator (LTI), the LTI indicating the time since a last transmission of the first and/or second user data by the base station, and
the UE is configured to determine the time of the last data transmission of data by the base station using the LTI, and to send the feedback in case the time since the last transmission of data by the base station is below a predefined threshold.

14. The user device (UE) of claim 13, wherein the UE is configured to
use pre-configured UE-specific uplink resources for reporting the feedback,
detect, using the second DAI and/or the LTI, a missed transmission of data by the base station, and
send the feedback if a time for the uplink of the feedback using the UE-specific uplink resources has not passed at the time of detecting the missed transmission.

15. The user device (UE) of claim 13, wherein, responsive to detecting a missed transmission of user data and in case a time passed since a last transmission as indicated by the LTI is below a predefined threshold, the UE is configured to blind decode the missed transmission using one or more previous parameters, e.g., using the same frequency resources and MCS level, using the same frequency resources and trying a different MCS level, or using the same MSC level and trying different frequency resources.

16. The user device (UE) of claim 13, wherein, responsive to detecting a missed transmission of control data and in case a time passed since a last transmission as indicated by the LTI is below a predefined threshold, the UE is configured to perform a transmission of uplink data using one or more previous parameters, e.g., using the same frequency resources and MCS level, using the same frequency resources and trying a different MCS level, or using the same MSC level and trying different frequency resources.

17. The user device (UE) of claim 1, wherein:
the UE comprises one or more of
a mobile terminal, or
stationary terminal, or
cellular IoT-UE, or
vehicular UE, or
an IoT or narrowband IoT, NB-IoT, device, or
a ground based vehicle, or
an aerial vehicle, or
a drone, or
a moving base station, or
road side unit, or a building, or any other item or device provided with network connectivity enabling the item/device to communicate using the wireless communication network, e.g., a sensor or actuator, and the base station comprises one or more of a macro cell base station, or a small cell base station, or a central unit of a base station, or a distributed unit of a base station, or a road side unit, or a UE, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

18. A base station for a wireless communication system, the wireless communication system comprising one or more base stations and one or more user devices (UEs), wherein the base station is configured to:

transmit data to a UE being served by the base station, the data comprising control data and user data, the user data comprising at least first user data and second user data, the first user data associated with a first service and second user data associated with a second service, the first and second services comprising one or more different transmission requirements, and receive from the UE a feedback, the feedback indicating for one or more data blocks of the data a successful or non-successful reception at the UE, wherein the control data comprises a first downlink assignment index, DAI, associated with the first user data, and a second DAI associated with the second user data.

19. A method for operating a user device (UE) of a wireless communication system, the wireless communication system comprising one or more base stations and the UE being served by a base station, the method comprising:

receiving, by the user device (UE), data, the data comprising control data and user data, the user data comprising at least first user data and second user data, the first user data associated with a first service and second user data associated with a second service, the first and second services comprising one or more different transmission requirements, and responsive to receiving in the control data a grant for a feedback transmission, sending, by the UE, a feedback to the base station, the feedback indicating for one or more data blocks of the data a successful or non-successful reception at the UE, wherein the control data comprises a first downlink assignment index, DAI, associated with the first user data, and a second DAI associated with the second user data.

* * * * *